US012739751B2

(12) United States Patent
Lee et al.

(10) Patent No.: US 12,739,751 B2
(45) Date of Patent: Sep. 15, 2026

(54) ELECTRONIC DEVICE OPTIMIZING CURRENT CONSUMPTION BY CONSIDERING A WAKE UP SIGNAL AND OPERATING METHOD THEREOF

(71) Applicant: Samsung Electronics Co., Ltd., Suwon-si (KR)

(72) Inventors: Hyoungjoo Lee, Suwon-si (KR); Junsuk Kim, Suwon-si (KR); Minho Yang, Suwon-si (KR); Taeyoon Kim, Suwon-si (KR); Euichang Jung, Suwon-si (KR); Chaeman Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 281 days.

(21) Appl. No.: 18/636,922

(22) Filed: Apr. 16, 2024

(65) Prior Publication Data

US 2024/0267848 A1 Aug. 8, 2024

Related U.S. Application Data

(63) Continuation of application No. PCT/KR2022/014314, filed on Sep. 26, 2022.

(30) Foreign Application Priority Data

Nov. 9, 2021 (KR) ........................ 10-2021-0152707
Nov. 26, 2021 (KR) ........................ 10-2021-0165935

(51) Int. Cl.
*H04W 52/02* (2009.01)
*H04B 7/06* (2006.01)
(Continued)

(52) U.S. Cl.
CPC ...... *H04W 52/0235* (2013.01); *H04B 7/0696* (2023.05); *H04B 17/328* (2023.05);
(Continued)

(58) Field of Classification Search
CPC ......... H04W 56/0015; H04W 52/0235; H04W 76/28; H04W 52/52; H04B 17/328; H04B 7/0696
See application file for complete search history.

(56) References Cited

U.S. PATENT DOCUMENTS 9,402,273 B2 7/2016 Farajidana et al.
10,548,182 B2 1/2020 Luo et al.
(Continued)

FOREIGN PATENT DOCUMENTS

KR 10-1205482 B1 11/2012
KR 10-2020-0025934 A 3/2020
(Continued)

OTHER PUBLICATIONS

Sony, Association of dual polarized SSBs, 3GPP TSG RAN WG1#104e, R1-2100868, E-meeting, Jan. 25-Feb. 5, 2021.
(Continued)

*Primary Examiner* — Sulaiman Nooristany
(74) *Attorney, Agent, or Firm* — Jefferson IP Law, LLP

(57) ABSTRACT

An electronic device and a method of operating the same are provided. The electronic device includes an antenna module, a first communication module configured to transmit and receive a signal to and from a base station through the antenna module, memory storing one or more computer programs, and one or more processors communicatively coupled to the first communication module, the antenna module, and the memory, wherein the one or more computer programs include computer-executable instructions that, when executed by the one or more processors, cause the
(Continued)

electronic device to identify a reception timing of a wake up signal based on wake up signal configuration information received from the base station, select one of transmission beams of the base station and one of reception beams of the electronic device as a beam pair, measure a reception strength of the selected transmission beam of the beam pair using the selected reception beam of the beam pair in a synchronization signal block (SSB) burst period before the reception timing arrives, stabilize a synchronization loop including at least one radio frequency (RF) element through an SSB of the selected transmission beam of the beam pair, detect the wake up signal transmitted from the base station at the reception timing, and determine whether to perform a beam searching operation based on the measured reception strength and a reception strength of the wake up signal.

17 Claims, 7 Drawing Sheets

(51) Int. Cl.

| | |
|---|---|
| ***H04B 17/318*** | (2015.01) |
| ***H04W 52/52*** | (2009.01) |
| ***H04W 56/00*** | (2009.01) |
| ***H04W 76/28*** | (2018.01) |

(52) U.S. Cl.
CPC ....... *H04W 52/52* (2013.01); *H04W 56/0015* (2013.01); *H04W 76/28* (2018.02)

(56) References Cited

U.S. PATENT DOCUMENTS

| | | | | |
|---|---|---|---|---|
| 2004/0004962 | A1 | 1/2004 | Glazko et al. | |
| 2021/0068193 | A1* | 3/2021 | Kong | H04W 52/0264 |
| 2022/0053595 | A1* | 2/2022 | Kong | H04B 7/0617 |
| 2025/0240744 | A1* | 7/2025 | Zhu | H04W 56/0065 |

FOREIGN PATENT DOCUMENTS

| | | |
|---|---|---|
| KR | 10-2021-0039304 A | 4/2021 |
| KR | 10-2021-0059700 A | 5/2021 |

OTHER PUBLICATIONS

Moderator (Media Tek), Summary for Potential Power Saving Enhancements, 3GPP TSG RAN WG1 e-Meeting #102, R1-2007063, Aug. 17-28, 2020.

Qualcomm Incorporated, UE Power Consumption Reduction in RRM Measurements, 3GPP TSG-RAN WG1 Meeting #96, R1-1903017, Athens, Greece, Feb 25-Mar. 1, 2019.

International Search Report dated Dec. 14, 2022, issued in International Application No. PCT/KR2022/014314.

* cited by examiner

ELECTRONIC DEVICE OPTIMIZING CURRENT CONSUMPTION BY CONSIDERING A WAKE UP SIGNAL AND OPERATING METHOD THEREOF

CROSS-REFERENCE TO RELATED APPLICATION(S)

This application is a continuation application, claiming priority under § 365(c), of an International application No. PCT/KR2022/014314, filed on Sep. 26, 2022, which is based on and claims the benefit of a Korean patent application number 10-2021-0152707, filed on Nov. 9, 2021, in the Korean Intellectual Property Office, and of a Korean patent application number 10-2021-0165935, filed on Nov. 26, 2021, in the Korean Intellectual Property Office, the disclosure of each of which is incorporated by reference herein in its entirety.

BACKGROUND

1. Field

The disclosure relates to an electronic device.

2. Description of Related Art

According to the 3$^{rd}$ generation partnership project (3GPP) Release 15, an electronic device may monitor a physical downlink control channel (PDCCH) on duration of discontinuous reception (DRX) and may sleep the rest of the time.

According to the 3GPP Release 16, an electronic device may receive a wake up signal from a base station and may monitor a PDCCH on duration when a certain bit included in the wake up signal represents 1 and may sleep on duration when the bit represents 0.

The above information is presented as background information only to assist with an understanding of the disclosure. No determination has been made, and no assertion is made, as to whether any of the above might be applicable as prior art with regard to the disclosure.

SUMMARY

In the 3$^{rd}$ generation partnership project (3GPP) Release 15, a method of reducing an unnecessary activity period by scheduling additional operations (e.g., channel measurement and system information) on duration of discontinuous reception (DRX) by an electronic device is proposed. In the 3GPP Release 16, when a certain bit in a wake up signal represents 0, the electronic device sleeps without monitoring a physical downlink control channel (PDCCH) on duration, so it is difficult for the method proposed in the 3GPP Release 15 to be applied to the 3GPP Release 16.

Aspects of the disclosure are to address at least the above-mentioned problems and/or disadvantages and to provide at least the advantages described below. Accordingly, an aspect of the disclosure is to provide an electronic device that minimizes current consumption by considering a wake up signal of the 3GPP Release 16.

Another aspect of the disclosure is to provide an electronic device that determines whether to perform an additional operation by considering a wake up signal of the 3GPP Release 16.

Additional aspects will be set forth in part in the description which follows and, in part, will be apparent from the description, or may be learned by practice of the presented embodiments.

In accordance with an aspect of the disclosure, an electronic device is provided. The electronic device includes an antenna module, a first communication module configured to transmit and receive a signal to and from a base station through the antenna module, memory storing one or more computer programs, and one or more processor communicatively coupled to the first communication module, the antenna module, and the memory, wherein the one or more computer programs include computer-executable instructions that, when executed by the one or more processors, cause the electronic device to identify a reception timing of a wake up signal based on wake up signal configuration information received from the base station, select one of transmission beams of the base station and one of reception beams of the electronic device as a beam pair, measure a reception strength of the selected transmission beam of the beam pair using the selected reception beam of the beam pair in a synchronization signal block (SSB) burst period before the reception timing arrives, stabilize a synchronization loop including at least one radio frequency (RF) element through an SSB of the selected transmission beam of the beam pair, detect the wake up signal transmitted from the base station at the reception timing, and determine whether to perform a beam searching operation based on the measured reception strength and a reception strength of the wake up signal.

In accordance with another aspect of the disclosure, an electronic device is provided. The electronic device includes an antenna module, a first communication module configured to transmit and receive a signal to and from a base station through the antenna module, memory storing one or more computer programs, and one or more processors communicatively coupled to the first communication module, the antenna module, and the memory, where the one or more computer programs include computer-executable instructions that, when executed by the one or more processors, cause the electronic device to identify a reception timing of a wake up signal based on wake up signal configuration information received from the base station, select one of transmission beams of the base station and one of reception beams of the electronic device as a beam pair, measure a reception strength of the selected transmission beam of the beam pair using the selected reception beam of the beam pair in an SSB burst period before the reception timing arrives, stabilize a synchronization loop including at least one RF element by adjusting a set value of at least one RF element through an SSB of the selected transmission beam of the beam pair, and detect the wake up signal at the reception timing and determine not to perform a beam searching operation when the measured reception strength exceeds a first threshold value, and a reception strength of the wake up signal exceeds a second threshold value.

In accordance with another aspect of the disclosure, a method of operating an electronic device is provided. The method includes receiving wake up signal configuration information from a base station, identifying a reception timing of a wake up signal based on the wake up signal configuration information, measuring a reception strength of each of a plurality of transmission beams of the base station using each of a plurality of reception beams of the electronic device, when a first reception strength of a first transmission beam measured using a first reception beam among the plurality of reception beams is the greatest, selecting the first reception beam and the first transmission beam as a first beam pair, measuring a second reception strength of the first transmission beam using the first reception beam in an SSB burst period before the reception timing arrives and stabilizing a synchronization loop including at least one RF element through an SSB of the first transmission beam, and detecting the wake up signal at the reception timing and determining whether to perform a beam searching operation based on the second reception strength and a reception strength of the wake up signal.

In accordance with another aspect of the disclosure, one or more non-transitory computer-readable storage media storing computer-executable instructions that, when executed by one or more processors of an electronic device, cause the electronic device to perform operations are provided. The operations include receiving wake up signal configuration information from a base station, identifying a reception timing of a wake up signal based on the wake up signal configuration information, measuring a reception strength of each of a plurality of transmission beams of the base station using each of a plurality of reception beams of the electronic device, when a first reception strength of a first transmission beam measured using a first reception beam among the plurality of reception beams is the greatest, selecting the first reception beam and the first transmission beam as a first beam pair, measuring a second reception strength of the first transmission beam using the first reception beam in a synchronization signal block (SSB) burst period before the reception timing arrives and stabilizing a synchronization loop comprising at least one radio frequency (RF) element through an SSB of the first transmission beam, and detecting the wake up signal at the reception timing and determining whether to perform a beam searching operation based on the second reception strength and a reception strength of the wake up signal.

An electronic device according to various embodiments determines whether to perform an additional operation by considering a wake up signal proposed in the 3$^{rd}$ generation partnership project (3GPP) Release 16, so it is possible to optimize current consumption.

In addition, various effects directly or indirectly ascertained through the disclosure is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
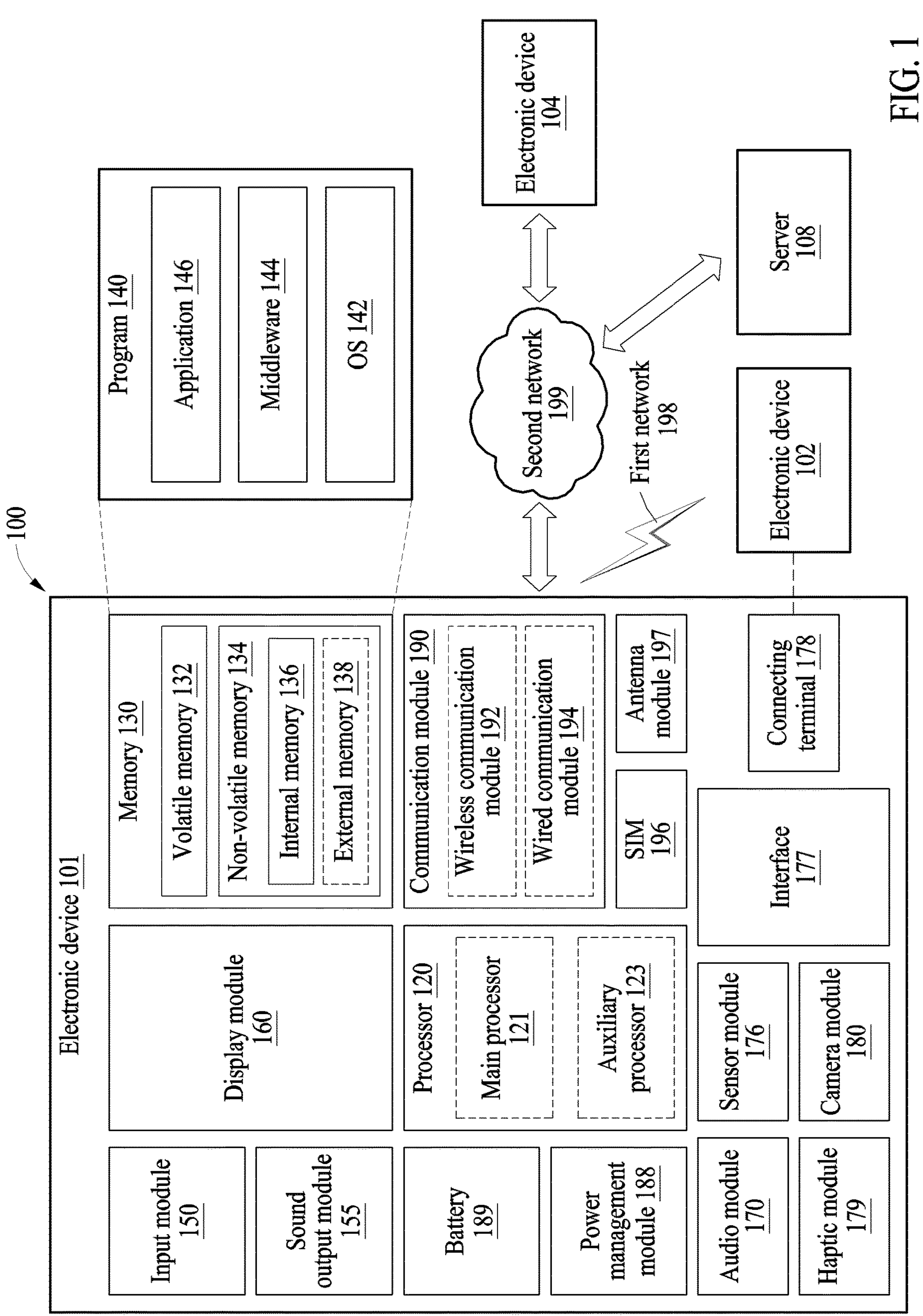
FIG. 1 is a block diagram of an electronic device in a network environment, according to an embodiment of the disclosure.

FIG. 1 is a block diagram of an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or communicate with at least one of an external electronic device 104 and a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, and a sensor module 176, an interface 177, a connecting terminal 178, a haptic module 179, a camera module 180, a motor 187, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added to the electronic device 101. In some embodiments of the disclosure, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computations. According to yet another embodiment of the disclosure, as at least a part of data processing or computations, the processor 120 may store a command or data received from another component (e.g., the sensor module 176 or the communication module 190) in volatile memory 132, process the command or the data stored in the volatile memory 132, and store resulting data in non-volatile memory 134. According to yet another embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., a sleep) state or along with the main processor 121 while the main processor 121 is an active state (e.g., executing an application). According to yet another embodiment of the disclosure, the auxiliary processor 123 (e.g., an ISP or a CP) may be implemented as a portion of another component (e.g., the camera module 180 or the communication module 190) that is functionally related to the auxiliary processor 123. According to yet another embodiment of the disclosure, the auxiliary processor 123 (e.g., an NPU) may include a hardware structure specifically for artificial intelligence model processing. An artificial intelligence model may be generated by machine learning. The machine learning may be performed by, for example, the electronic device 101, in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence (AI) model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive, from outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to yet another embodiment of the disclosure, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control its corresponding one of the display, the hologram device, and the projector. According to yet another embodiment of the disclosure, the display module 160 may include a touch sensor adapted to detect a touch, or a pressure sensor adapted to measure the intensity of force of the touch. The display module 160 may be implemented with, for example, a foldable structure and/or a rollable structure. For example, a size of a display screen of the display module 160 may be reduced when folded and expanded when unfolded.

The audio module 170 may convert sound into an electric signal or vice versa. According to yet another embodiment of the disclosure, the audio module 170 may obtain the sound via the input module 150 or output the sound via the sound output module 155 or an external electronic device (e.g., the external electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to yet another embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used by the electronic device 101 to couple with the external electronic device (e.g., the external electronic device 102) directly (e.g., by wire) or wirelessly. According to yet another embodiment of the disclosure, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the external electronic device 102). According to yet another embodiment of the disclosure, the connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus, which may be recognized by a user via their tactile sensation or kinesthetic sensation. According to yet another embodiment of the disclosure, the haptic module 179 may include, for example, a motor, a piezoelectric element, or an electric stimulator.

The camera module 180 may capture a still image and moving images. According to yet another embodiment of the disclosure, the camera module 180 may include one or more lenses, image sensors, ISPs, and flashes.

The power management module 188 may manage power supplied to the electronic device 101. According to yet another embodiment of the disclosure, the power management module 188 may be implemented as, for example, at least a part of a power management integrated circuit (PMIC).

The battery 189 may supply power to at least one component of the electronic device 101. According to yet another embodiment of the disclosure, the battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more CPs that are operable independently from the processor 120 (e.g., an AP) and that support direct (e.g., wired) communication or wireless communication. According to yet another embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device, for example, the external electronic device 104, via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the external electronic device 104), or a network system (e.g., the second network 199). According to yet another embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to yet another embodiment of the disclosure, the antenna module 197 may include an antenna including a radiating element including a conductive material or a conductive pattern formed in or on a substrate (e.g., a printed circuit board (PCB)). According to yet another embodiment of the disclosure, the antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to yet another embodiment of the disclosure, another component (e.g., a radio frequency integrated circuit (RFIC)) other than the radiating element may be additionally formed as a part of the antenna module 197.

According to various embodiments of the disclosure, the antenna module 197 may form a mmWave antenna module. According to yet another embodiment of the disclosure, the mmWave antenna module may include a PCB, an RFIC on a first surface (e.g., the bottom surface) of the PCB, or adjacent to the first surface of the PCB and capable of supporting a designated high-frequency band (e.g., a mmWave band), and a plurality of antennas (e.g., array antennas) disposed on a second surface (e.g., the top or a side surface) of the PCB, or adjacent to the second surface of the PCB and capable of transmitting or receiving signals of the designated high-frequency band.

At least some of the above-described components may be coupled mutually and exchange signals (e.g., commands or data) therebetween via an inter-peripheral communication scheme (e.g., a bus, general purpose input and output (GPIO), serial peripheral interface (SPI), or mobile industry processor interface (MIPI)).

According to yet another embodiment of the disclosure, commands or data may be transmitted or received between the electronic device 101 and the external electronic device (e.g., the external electronic device 104) via the server 108 coupled with the second network 199. Each of the external electronic devices (e.g., the external electronic device 102 or 104) may be a device of the same type as or a different type from the electronic device 101. According to yet another embodiment of the disclosure, all or some of operations to be executed by the electronic device 101 may be executed by one or more external electronic devices (e.g., the external electronic devices 102 and 104 and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or service. The one or more external electronic devices receiving the request may perform the at least part of the function or service, or an additional function or an additional service related to the request and may transfer a result of the performance to the electronic device 101. The electronic device 101 may provide the result, with or without further processing the result, as at least part of a response to the request. To that end, cloud computing, distributed computing, mobile edge computing (MEC), or client-server computing technology may be used, for example. The electronic device 101 may provide ultra low-latency services using, e.g., distributed computing or MEC. In an embodiment of the disclosure, the external electronic device (e.g., the external electronic device 104) may include an Internet-of-things (IoT) device. The server 108 may be an intelligent server using machine learning and/or a neural network. According to yet another embodiment of the disclosure, the external electronic device (e.g., the external electronic device 104) or the server 108 may be included in the second network 199. The electronic device 101 may be applied to intelligent services (e.g., a smart home, a smart city, a smart car, or healthcare) based on 5G communication technology or IoT-related technology.

The electronic device according to various embodiments may be one of various types of electronic devices. The electronic device may include, for example, a portable communication device (e.g., a smartphone), a computer device, a portable multimedia device, a portable medical device, a camera, a wearable device, or a home appliance device. According to yet another embodiment of the disclosure, the electronic device is not limited to those described above.

It should be understood that various embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms, such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to yet another embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to yet another embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
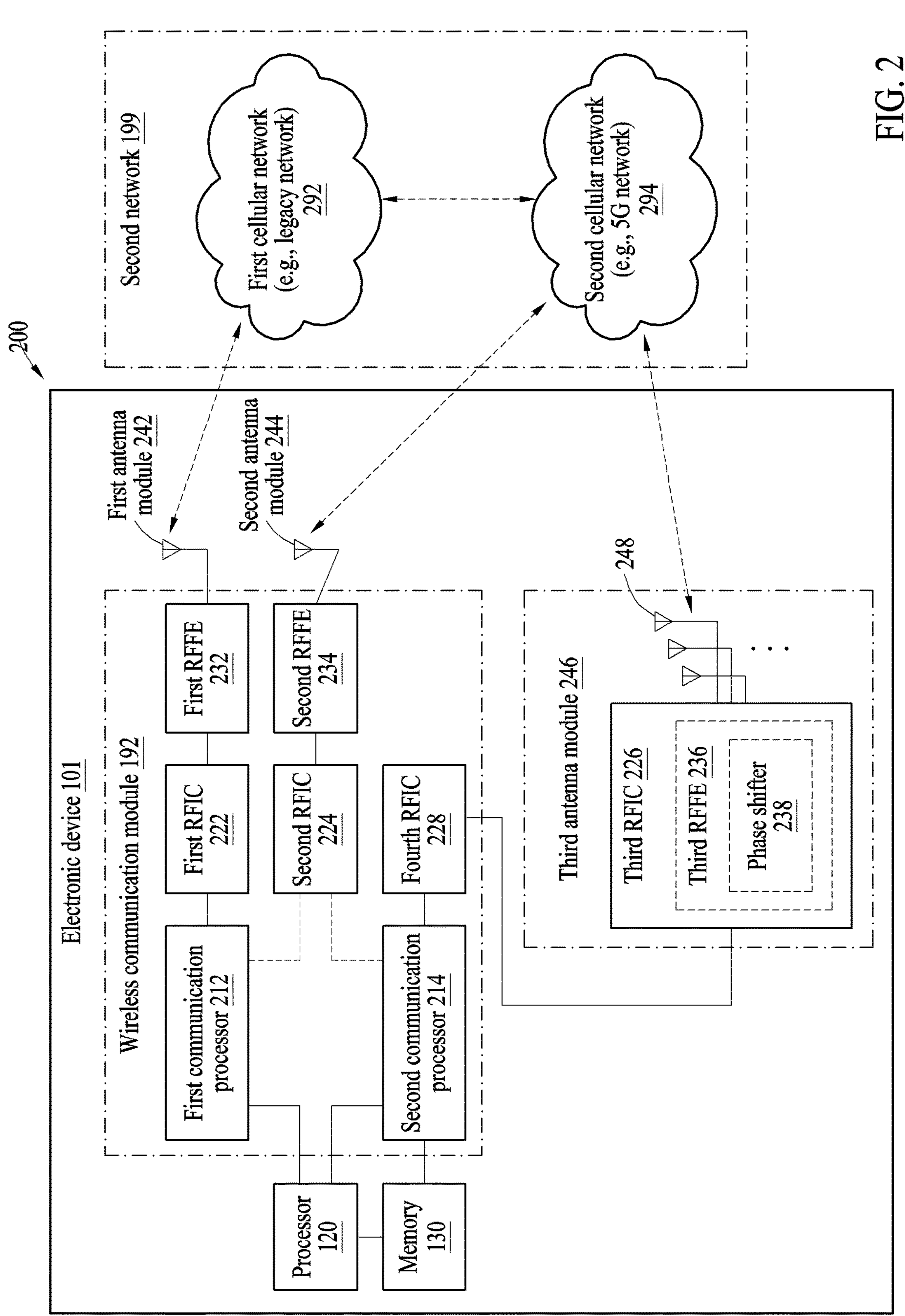
FIG. 2 is a block diagram of an electronic device in a network environment including a plurality of cellular networks, according to an embodiment of the disclosure.

FIG. 2 is a block diagram of an electronic device in a network environment including a plurality of cellular networks, according to an embodiment of the disclosure.

Referring to FIG. 2, an electronic device 101 includes a first communication processor 212, a second communication processor 214, a first RFIC 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first cellular network 292 and a second cellular network 294. According to another embodiment of the disclosure, the electronic device 101 may further include at least one component of the components described with reference to FIG. 1, and the second network 199 may further include at least one other network.

According to various embodiments of the disclosure, the first communication processor 212, the second communication processor 214, the first RFIC 222, the second RFIC 224, the fourth RFIC 228, the first RFFE 232, and the second RFFE 234 may form at least a portion of the wireless communication module 192. According to another embodiment of the disclosure, the fourth RFIC 228 may be omitted or included as a portion of the third RFIC 226.

According to various embodiments of the disclosure, the first communication processor 212 may support the establishment of a communication channel in the band to be used for wireless communication with the first cellular network 292, and legacy network communication through the established communication channel. According to various embodiments of the disclosure, the first cellular network 292 may be a legacy network including a second generation (2G), third generation (3G), fourth generation (4G), or long-term evolution (LTE) network. The second communication processor 214 may support the establishment of a communication channel corresponding to the designated band (e.g., about 6 gigahertz (GHz) to about 60 GHz) among the bands to be used for wireless communication with the second cellular network 294, and fifth generation (5G) network communication through the established communication channel. According to various embodiments of the disclosure, the second cellular network 294 may be a 5G network defined by a 3$^{rd}$ generation partnership project (3GPP).

According to various embodiments of the disclosure, the first communication processor 212 or the second communication processor 214 may support the establishment of a communication channel corresponding to another designated band (e.g., about 6 GHz or less) among the bands to be used for wireless communication with the second cellular network 294, and 5G network communication through the established communication channel.

According to various embodiments of the disclosure, the first communication processor 212 and the second communication processor 214 may be implemented in a single chip or a single package. According to various embodiments of the disclosure, the first communication processor 212 or the second communication processor 214 may be formed in a single chip or a single package with the processor 120, the auxiliary processor 123, or the communication module 190.

According to various embodiments of the disclosure, the first communication processor 212 and the second communication processor 214 may be directly or indirectly connected to each other by an interface (not shown) and may provide or receive data or a control signal in one direction or both directions.

According to various embodiments of the disclosure, at the time of transmission, the first RFIC 222 may convert a baseband signal generated by the first communication processor 212 into a radio frequency (RF) signal of about 700 megahertz (MHz) to about 3 GHz used in the first cellular network 292 (e.g., the legacy network). At the time of reception, the RF signal may be obtained from the first cellular network 292 (e.g., the legacy network) through an antenna (e.g., the first antenna module 242) and may be preprocessed by an RFFE (e.g., the first RFFE 232). The first RFIC 222 may convert the preprocessed RF signal into the baseband signal so that the preprocessed RF may be processed by the first communication processor 212.

According to various embodiments of the disclosure, at the time of transmission, the second RFIC 224 may convert a baseband signal generated by the first communication processor 212 or the second communication processor 214 into an RF signal (hereinafter, referred to as a 5G Sub6 RF signal) in the Sub6 band (e.g., about 6 GHz or less) used in the second cellular network 294 (e.g., the 5G network). At the time of reception, the 5G Sub6 RF signal may be obtained from the second cellular network 294 (e.g., the 5G network) through an antenna (e.g., the second antenna module 244) and may be preprocessed by an RFFE (e.g., the second RFFE 234). The second RFIC 224 may convert the preprocessed 5G Sub6 RF signal into the baseband signal so that the preprocessed 5G Sub6 RF signal may be processed by a communication processor corresponding to the first communication processor 212 or the second communication processor 214.

According to various embodiments of the disclosure, the third RFIC 226 may convert a baseband signal generated by the second communication processor 214 into an RF signal (hereinafter, referred to as a 5G Above6 RF signal) in the 5G Above6 band (e.g., about 6 GHz to about 60 GHz) to be used in the second cellular network 294 (e.g., the 5G network). At the time of reception, the 5G Above6 RF signal may be obtained from the second cellular network 294 (e.g., the 5G network) through an antenna (e.g., the antenna 248) and may be preprocessed by the third RFFE 236. The third RFIC 226 may convert the preprocessed 5G Above6 RF signal into the baseband signal so that the preprocessed 5G Above6 RF signal may be processed by the second communication processor 214. According to various embodiments of the disclosure, the third RFFE 236 may be formed as a portion of the third RFIC 226.

According to various embodiments of the disclosure, the electronic device 101 may include the fourth RFIC 228 separately from or as at least a portion of the third RFIC 226. In this case, the fourth RFIC 228 may convert the baseband signal generated by the second communication processor 214 into an RF signal (hereinafter, referred to as an IF signal) in the intermediate frequency band (e.g., about 9 GHz to about 11 GHz) and then may transmit the IF signal to the third RFIC 226. The third RFIC 226 may convert the IF signal into the 5G Above6 RF signal. At the time of reception, the 5G Above6 RF signal may be received from the second cellular network 294 (e.g., the 5G network) through an antenna (e.g., the antenna 248) and may be converted into the IF signal by the third RFIC 226. The fourth RFIC 228 may convert the IF signal into the baseband signal so that the second communication processor 214 may process the IF signal.

According to various embodiments of the disclosure, the first RFIC 222 and the second RFIC 224 may be implemented as at least a portion of a single chip or a single package. According to various embodiments of the disclosure, the first RFFE 232 and the second RFFE 234 may be implemented as at least a portion of a single chip or a single package. According to various embodiments of the disclosure, at least one of the first antenna module 242 or the second antenna module 244 may be omitted or combined with another antenna module to process RF signals in a plurality of corresponding bands.

According to various embodiments of the disclosure, the third RFIC 226 and the antenna 248 may be disposed on the same substrate and may form a third antenna module 246. For example, the wireless communication module 192 or the processor 120 may be disposed on a first substrate (e.g., a main PCB). In this case, the third RFIC 226 may be disposed on a partial area (e.g., a lower surface) of a second substrate (e.g., a sub-PCB) that is separate from the first substrate, and the antenna 248 may be disposed on the other partial area (e.g., an upper surface), so the third antenna module 246 may be formed. By disposing the third RFIC 226 and the antenna 248 on the same substrate, it may be possible to reduce the length of a transmission line therebetween. For example, this may reduce loss (e.g., attenuation) of a signal in the high-frequency band (e.g., about 6 GHz to about 60 GHz) used for 5G network communication by the transmission line. Accordingly, the electronic device 101 may improve the quality or speed of communication with the second cellular network 294 (e.g., the 5G network).

According to various embodiments of the disclosure, the antenna 248 may be formed as an antenna array including a plurality of antenna elements that may be used for beamforming. In this case, the third RFIC 226, for example, as a portion of the third RFFE 236, may include a plurality of phase shifters 238 corresponding to the plurality of antenna elements. At the time of transmission, each of the plurality of phase shifters 238 may convert the phase of the 5G Above6 RF signal to be transmitted to the outside (e.g., a base station of the 5G network) of the electronic device 101 through a corresponding antenna element. At the time of reception, each of the plurality of phase shifters 238 may convert the phase of the 5G Above6 RF signal received from the outside through the corresponding antenna element into the same or substantially the same phase. This enables transmission or reception through beamforming between the electronic device 101 and the outside.

According to various embodiments of the disclosure, the second cellular network 294 (e.g., the 5G network) may be operated independently from (e.g., standalone (SA)) or be being connected to (e.g., non-standalone (NSA)) the first cellular network 292 (e.g., the legacy network). For example, the 5G network may have only an access network (e.g., a 5G radio access network (RAN) or next generation RAN (NG RAN)) and no core network (e.g., a next-generation core (NGC)). In this case, the electronic device 101 may access the access network of the 5G network and then may access an external network (e.g., the Internet) under the control of the core network (e.g., an evolved packet core (EPC)) of the legacy network. Protocol information (e.g., LTE protocol information) for communication with the legacy network or protocol information (e.g., new radio (NR) protocol information) for communication with the 5G network may be stored in the memory 130 and may be accessed by other components (e.g., the processor 120, the first communication processor 212, or the second communication processor 214).

Figure 3:
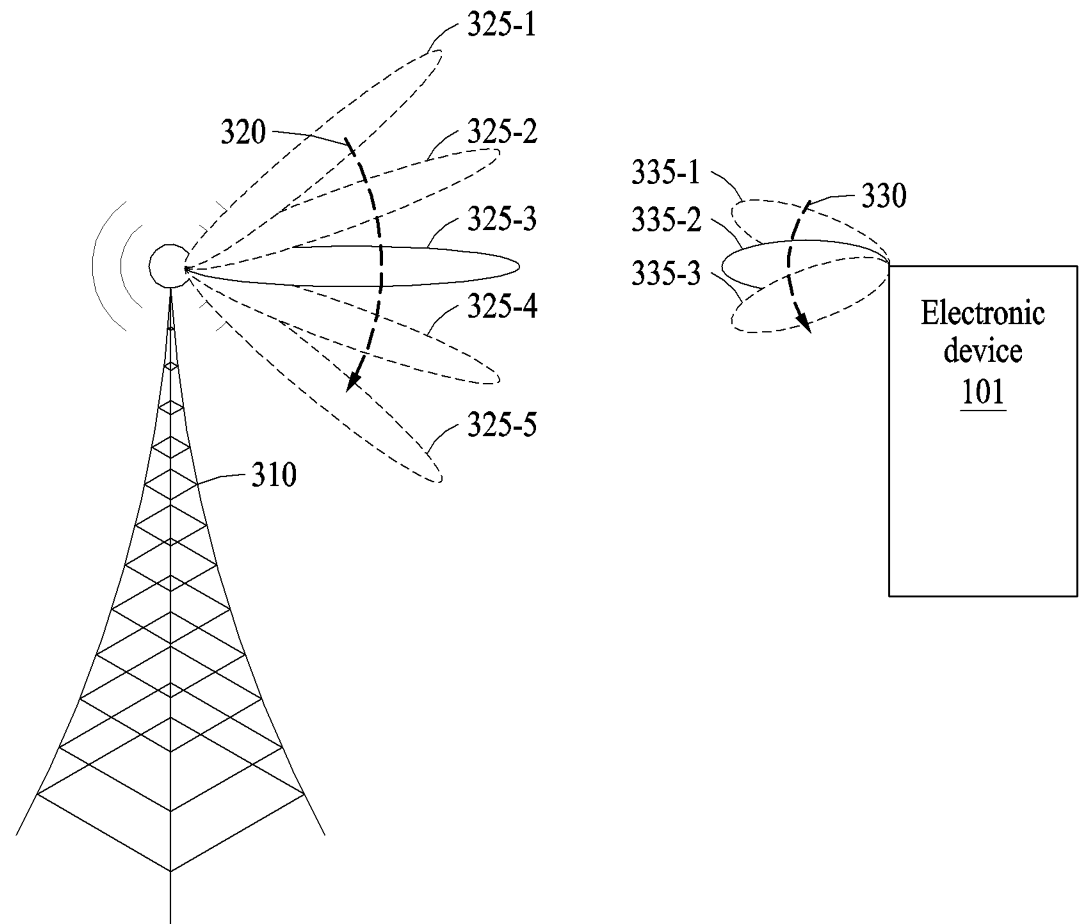
FIG. 3 illustrates an embodiment of an operation for a wireless communication connection between a base station and an electronic device in a second network of FIG. 2 that uses a directional beam for a wireless connection, according to an embodiment of the disclosure.

FIG. 3 illustrates an embodiment of an operation for a wireless communication connection between a base station and an electronic device in a second network of FIG. 2 that uses a directional beam for a wireless connection according to an embodiment of the disclosure.

Referring to FIG. 3, first, a base station (gNodeB (gNB), a transmission-reception point (TRP)) may perform a beam detection operation with the electronic device 101 for a wireless communication connection. In an embodiment of the disclosure, for the beam detection, a base station 310 may perform a transmission beam sweeping 320 by sequentially transmitting a plurality of transmission beams, for example, first to fifth transmission beams 325-1 to 325-5 having different directions.

According to various embodiments of the disclosure, the first to fifth transmission beams 325-1 to 325-5 may include at least one synchronization sequence (SS)/physical broadcast channel (PBCH) block. The SS/PBCH block may be used to measure a channel or beam strength of the electronic device 101 periodically.

In another embodiment of the disclosure, the first to fifth transmission beams 325-1 to 325-5 may include at least one channel state information-reference signal (CSI-RS). The CSI-RS is a standard/reference signal that the base station 310 may set to be flexible and may be transmitted periodically/semi-persistently or aperiodically. The electronic device 101 may measure a channel and beam strength using the CSI-RS.

According to various embodiments of the disclosure, the first to fifth transmission beams 325-1 to 350-5 may form a radiation pattern having a selected beam width. For example, the first to fifth transmission beams 325-1 to 350-5 may have a broad radiation pattern having a first beam width or a sharp radiation pattern having a second beam width that is narrower than the first beam width. For example, transmission beams including the SS/PBCH block may have a radiation pattern broader than transmission beams including the CSI-RS.

According to various embodiments of the disclosure, the electronic device 101 may perform reception beam sweeping 330 while the base station 310 performs the transmission beam sweeping 320. For example, the electronic device 101 may receive a signal of the SS/PBCH block transmitted from at least one of the first to fifth transmission beams 325-1 to 350-5 by fixing a first reception beam 335-1 in a first direction while the base station 310 performs the transmission beam sweeping 320. The electronic device 101 may receive a signal of the SS/PBCH block transmitted from the first to fifth transmission beams 325-1 to 350-5 by fixing a second reception beam 335-2 in a second direction while the base station 310 performs the transmission beam sweeping 320. As described above, the electronic device 101 may select a reception beam (e.g., the second reception beam 335-2) and a transmission beam (e.g., a third transmission beam 325-3), which are communicable, based on the signal reception operation result through the reception beam sweeping 330.

As described above, after the communicable transmission and reception beams are determined, the base station 310 and the electronic device 101 may transmit and/or receive pieces of basic information for a cell configuration and may set information for an additional beam operation based on this. For example, beam operation information may include detailed information on the set beam, configuration information on the SS/PBCH block, CSI-RS, or additional standard signal.

According to various embodiments of the disclosure, the electronic device 101 may continuously monitor the channel and beam strength using at least one of the SS/PBCH block and CSI-RS included in a transmission beam. The electronic device 101 may adaptively select a beam with good beam quality using the monitoring operation. Optionally, when a communication connection is disconnected due to movement of the electronic device 101 or blocking of the beam, a communicable beam may be determined by reperforming the beam sweeping operation described above.

Figure 4:
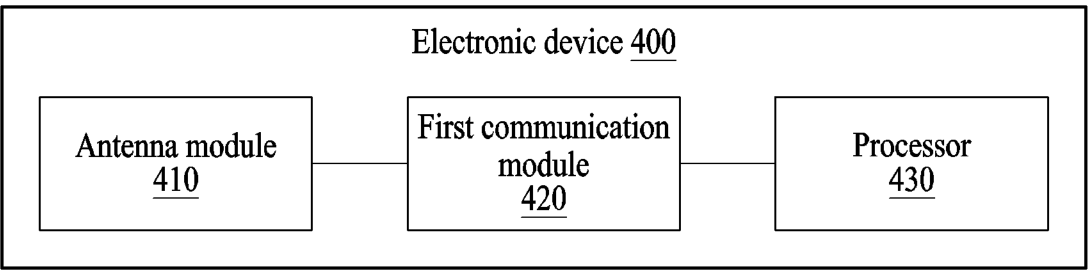
FIGS. 4 and 5 are block diagrams illustrating an operation of an electronic device, according to various embodiments of the disclosure.
Figure 5:
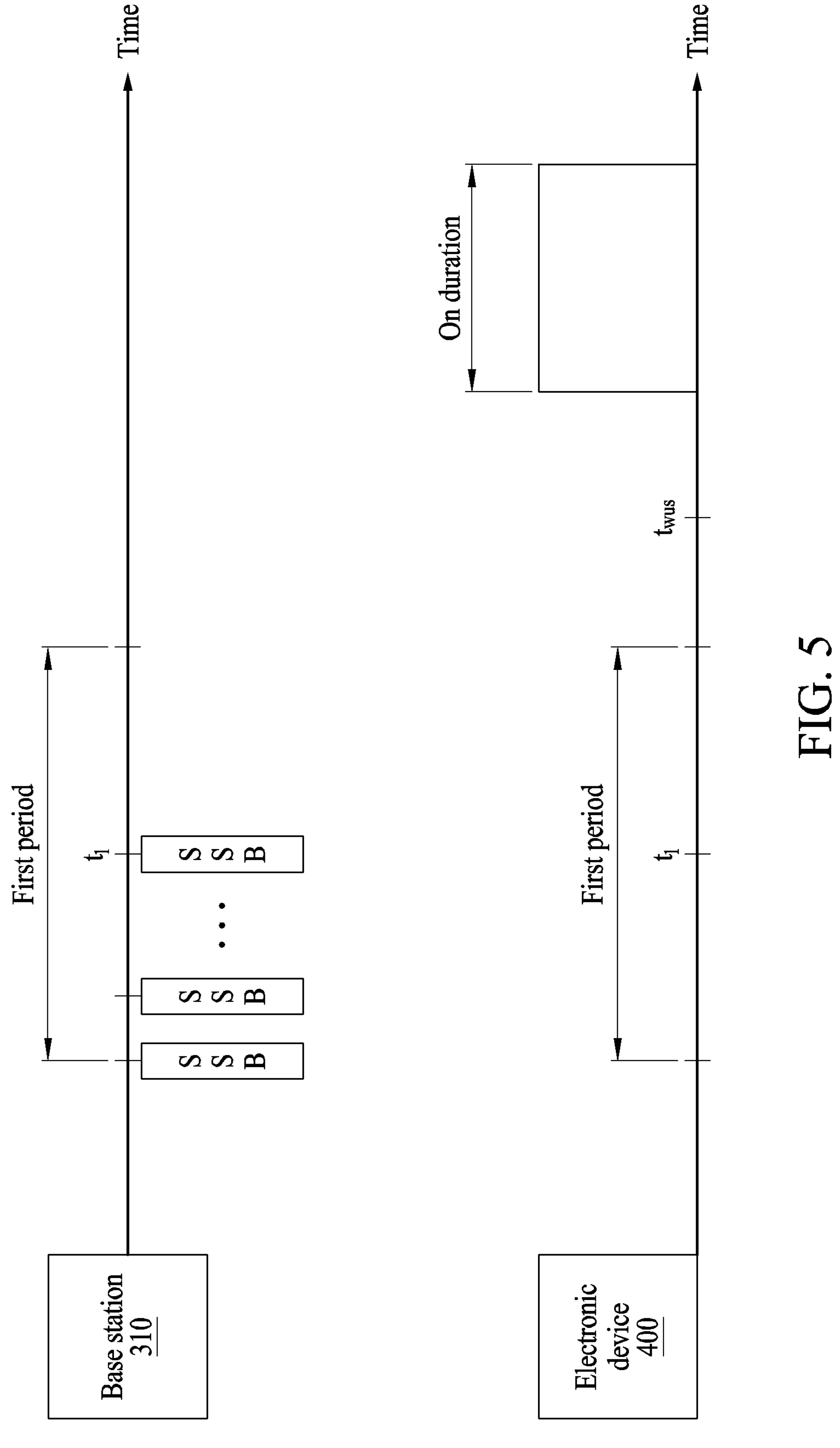

FIGS. 4 and 5 are block diagrams illustrating an operation of an electronic device according to various embodiments of the disclosure.

Referring to FIGS. 4 and 5, according to various embodiments of the disclosure, an electronic device 400 (e.g., the electronic device 101 of FIGS. 1 to 3) may include an antenna module 410 (e.g., the antenna module 197 of FIG. 1, the first antenna module 242 of FIG. 2, the second antenna module 244 of FIG. 2, and the third antenna module 246 of FIG. 2), a first communication module 420, and a processor 430 (e.g., the processor 120 of FIG. 1, the first communication processor 212 of FIG. 2, and the second communication processor 214 of FIG. 2).

According to various embodiments of the disclosure, the first communication module 420 may include all or at least one of the first RFIC 222, the second RFIC 224, the fourth RFIC 228, the first RFFE 232, and the second RFFE 234 of FIG. 2.

According to various embodiments of the disclosure, the first communication module 420 may transmit and receive a signal to and from the base station 310 through the antenna module 410. For example, the first communication module 420 may receive an RF signal from the base station 310 or may transmit the RF signal to the base station 310 through the antenna module 410.

According to various embodiments of the disclosure, the first communication module 420 may convert the RF signal received from the base station 310 into a baseband signal and may transmit the converted baseband signal to the processor 430. The first communication module 420 may receive the baseband signal from the processor 430, convert the received baseband signal into the RF signal, and transmit the RF signal to the base station 310.

According to various embodiments of the disclosure, the electronic device 400 may receive discontinuous reception (DRX) configuration information from the base station 310. The processor 430 may receive the DRX configuration information from the base station 310 through the antenna module 410 and the first communication module 420. The electronic device 400 may perform a DRX operation using the DRX configuration information. In an embodiment of the disclosure, the DRX configuration information may include, for example, but is not limited thereto, a short discontinuous transmission (DTX) cycle, long DTX cycle, DRX inactivity timer, DRX short cycle timer, on-duration timer, and DTX retransmission timer.

According to various embodiments of the disclosure, the electronic device 400 may receive wake up configuration information from the base station 310. The processor 430 may receive the wake up configuration information through the antenna module 410 and the first communication module 420. The processor 430 may identify a reception timing of a wake up signal ($t_{WUS}$) based on the wake up configuration information. In an embodiment of the disclosure, the wake up configuration information may include parameters (e.g., all or one or more of a power saving-radio network temporary identifier (ps-RNTI), ps-Offset, sizeDCI-2-6, ps-PositionDCI-2-6, ps-WakeUP, ps-TransmitPeriodicL1-RSRP, and ps-TransmitOtherPeriodicCSI) defined by the 3GPP Release 16.

According to various embodiments of the disclosure, an example of the wake up signal may be a downlink control information (DCI) with cyclic redundancy check (CRC) scrambled by ps-RNTI (DCP) signal. The wake up signal may include a first bit indicating whether the electronic device 400 wakes up and performs a data reception operation or sleeps in the on-duration section of the DRX.

According to various embodiments of the disclosure, the processor 430 may select a first transmission beam of the base station 310 and a first reception beam of the electronic device 400 as a first beam pair. For example, the processor 430 may measure a reception strength of each of a plurality of transmission beams (e.g., the first to fifth transmission beams 325-1 to 325-5 of FIG. 3) of the base station 310 using each of a plurality of reception beams (e.g., reception beams 325-1 to 335-3 of FIG. 3) of the electronic device 400 (or the antenna module 410) and may select the first reception beam and the first transmission beam as the first beam pair when a reception strength (hereinafter, referred to as a "first reception strength") of the first transmission beam measured using the first reception beam is the greatest.

According to various embodiments of the disclosure, the reception strength may include one or more of a signal-to-interference-plus-noise ratio (SINR), received signal strength indicator (RSSI), reference signal received power (RSRP), and reference signal received quality (RSRQ).

According to various embodiments of the disclosure, the base station 310 and the electronic device 400 may perform uplink communication and downlink communication through the first beam pair.

According to various embodiments of the disclosure, the processor 430 may stabilize a synchronization loop including at least one RF element by receiving a synchronization signal block (SSB) in a first period before the $t_{WUS}$ arrives. The first period may be an SSB burst period that is closest to the $t_{WUS}$. The synchronization loop may include, for example, but is not limited to, at least one of an automatic gain control (AGC) element and an automatic frequency control (AFC) element in the electronic device 400. The stabilization of the synchronization loop may represent the adjustment of a set value of at least one RF element in the synchronization loop.

According to various embodiments of the disclosure, in the example shown in FIG. 5, the processor 430 may measure a reception strength (hereinafter, referred to as a "second reception strength") of the first transmission beam of the base station 310 using the first reception beam in the first period and may not measure a reception strength of each of other transmission beams of the base station 310. The processor 430 may be aware of a transmission time of each of transmission beams of the base station 310 in the first period. The processor 430 may measure the reception strength of the first transmission beam using the first reception beam at a transmission time $t_1$ of the first transmission beam and may not measure the reception strength of the transmission beam of the base station 310 at each of other transmission times to reduce current consumption.

According to various embodiments of the disclosure, the processor 430 may stabilize the synchronization loop by receiving an SSB of the first transmission beam through the first reception beam. In an embodiment of the disclosure, the processor 430 may stabilize the synchronization loop by adjusting the gain of the AGC element using the measured second reception strength. The synchronization loop may be stabilized by adjusting the frequency offset of the AFC element. The frequency offset may include, for example, a value to compensate for a shifted frequency. A first frequency may be used to transmit the SSB of the first transmission beam in the base station 310. A frequency shift may occur between the base station 310 and the electronic device 400 due to the Doppler effect. A reception frequency of an SSB of the electronic device 400 may correspond to a shifted first frequency. The processor 430 may be aware of the first frequency and may adjust the frequency offset of the AFC element to compensate for the shifted first frequency with the first frequency.

According to various embodiments of the disclosure, the processor 430 may determine whether a difference between the second reception strength and the first reception strength is less than or equal to a predetermined level. The processor 430 may determine that a wireless channel environment between the electronic device 400 and the base station 310 is better while the electronic device 400 sleeps when the second reception strength is greater than the first reception strength by a predetermined level. The processor 430 may adjust the gain of the AGC element using the second reception strength of the first transmission beam and/or may adjust the frequency offset of the AFC element using the frequency of the SSB of the first transmission beam. The processor 430 may determine that the wireless channel environment between the electronic device 400 and the base station 310 is deteriorated while the electronic device 400 sleeps when the second reception strength is less than the first reception strength by a predetermined level. In this case, according to yet another embodiment of the disclosure, the processor 430 may perform an operation of searching for an optimal beam pair between the electronic device 400 and the base station 310. The processor 430 may determine that the wireless channel environment between the electronic device 400 and the base station 310 is not changed while the electronic device 400 sleeps when the difference between the second reception strength and the first reception strength is less than or equal to a predetermined level. In this case, according to yet another embodiment of the disclosure, the processor 430 may maintain the gain of the AGC element and/or the frequency offset of the AFC element. In another embodiment of the disclosure, the processor 430 may adjust the gain of the AGC element using the second reception strength of the first transmission beam and/or may adjust the frequency offset of the AFC element using the frequency of the SSB of the first transmission beam.

According to various embodiments of the disclosure, the base station 310 may transmit the wake up signal to the electronic device 400. The processor 430 may determine whether the wake up signal of the base station 310 is detected at the $t_{WUS}$. For example, the processor 430 may determine that the wake up signal is detected when a reception strength of the wake up signal is greater than or equal to a first strength value (e.g., 3 decibels (dB)) and may determine that the wake up signal is not detected when the reception strength of the wake up signal is less than the first strength value.

According to various embodiments of the disclosure, the processor 430 may determine whether to perform a first operation based on the second reception strength of the first transmission beam and the reception strength of the wake up signal when the wake up signal is detected.

In an embodiment of the disclosure, the processor 430 may determine not to perform an unnecessary beam searching operation when the wake up signal is detected, the second reception strength of the first transmission beam exceeds a first threshold value, and the reception strength of the wake up signal exceeds a second threshold value (e.g., 8 dB). The unnecessary beam searching operation may include, for example, but is not limited thereto, beamforming-based signal scanning (e.g., a reception beam change) for SSB reception, and channel measurement, which are performed regularly.

In an embodiment of the disclosure, the processor 430 may determine that it is difficult for the electronic device 400 to perform a normal operation (e.g., a data reception operation through the first beam pair) when the wake up signal fails to be detected, and the second reception strength of the first transmission beam is less than the first threshold value, and may perform the beam searching operation. For example, the processor 430 may operate to change the first beam pair to a second beam pair when a reception strength of the second beam pair between the electronic device 400 and the base station 310 is the greatest.

In an embodiment of the disclosure, the processor 430 may determine that it is difficult for the electronic device 400 to perform the normal operation (e.g., the data reception operation through the first beam pair) when the wake up signal is detected, the second reception strength of the first transmission beam is less than the first threshold value, and the reception strength of the wake up signal is less than the second threshold value, and may perform the beam searching operation. For example, the processor 430 may operate to change the first beam pair to the second beam pair when the reception strength of the second beam pair between the electronic device 400 and the base station 310 is the greatest.

In an embodiment of the disclosure, a first case in which the wake up signal is detected, the second reception strength is less than the first threshold value, and the reception strength of the wake up signal exceeds the second threshold value may occur. The processor 430 may perform the beam searching operation when the first case is repeated more than the first number of times (e.g., three times). Rather than performing the beam searching operation whenever the first case occurs, power consumption may be reduced by performing the beam searching operation when the first case is repeated more than the first number of times.

In an embodiment of the disclosure, a second case in which the wake up signal fails to be detected, and the second reception strength exceeds the first threshold value may occur. The processor 430 may identify that the second case is repeated more than the second number of times (e.g., three times). The second case may be repeated more than the second number of times due to the problem with the transmission and reception of the wake up signal between the electronic device 400 and the base station 310. The processor 430 may transmit a first scheduling request (SR) signal to the base station 310 when the second case is repeated more than the second number of times. The first SR signal may have, for example, an SR resource that is different from a beam failure recovery. When the first SR signal is normally received, the base station 310 may transmit physical downlink control channel (PDCCH) information including a resource allocation and a modulation and coding scheme (MCS) for uplink data transmission to the electronic device 400. The processor 430 may perform a random-access channel (RACH) operation when the PDCCH information is not received and may receive again the DRX configuration information from the base station 310.

Figure 6:
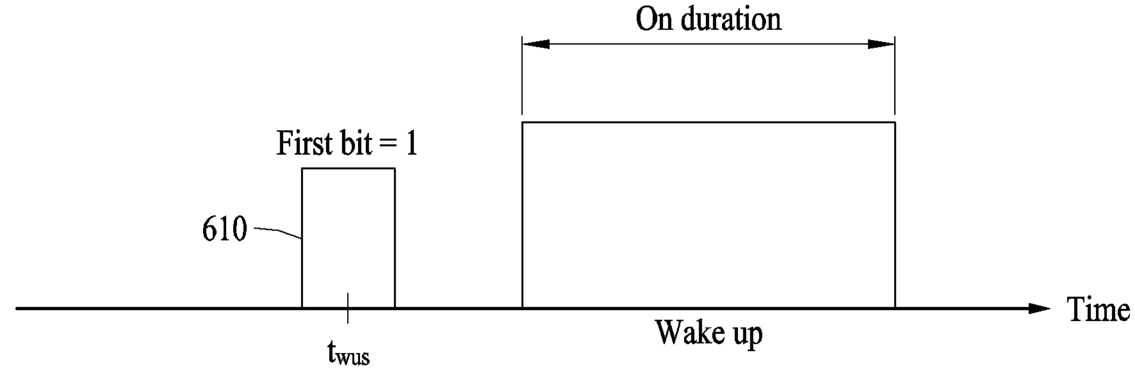
FIGS. 6 and 7 are diagrams illustrating a wake up and sleep of an electronic device, according to various embodiments of the disclosure.
Figure 7:
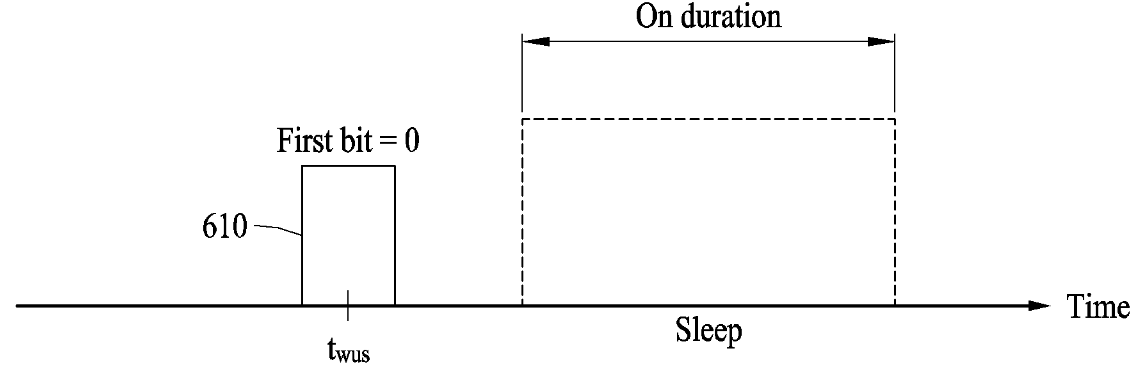

FIGS. 6 and 7 are diagrams illustrating a wake up and sleep of an electronic device according to various embodiments of the disclosure.

Referring to FIGS. 6 and 7, according to various embodiments of the disclosure, the electronic device 400 may receive a wake up signal 610 from the base station 310 at the $t_{WUS}$. The electronic device 400 may receive the wake up signal 610 from the base station 310 using a first reception beam. The electronic device 400 may identify a first bit by decoding the wake up signal 610.

Referring to FIG. 6, the electronic device 400 may perform a data reception operation on duration when the first bit is a first value (e.g., 1). In the example shown in FIG. 6, the electronic device 400 may receive data from the base station 310 through the first reception beam used to receive the wake up signal 610.

According to various embodiments of the disclosure, the electronic device 400 may operate a timer (e.g., an inactivity timer or hybrid automatic repeat and request (HARQ) timer) after performing the data reception operation and may enter an active state. The electronic device 400 may perform an operation of searching for an optimal beam pair between the electronic device 400 and the base station 310 in the active state.

According to various embodiments of the disclosure, the electronic device 400 may operate to satisfy the required requirements of the 3GPP standard (e.g., transmitting a channel measurement report to the base station 310 every first reporting period or checking system information). The electronic device 400 may determine how often at least one of the channel measurement operation and the system information check operation should be performed based on the performance of the electronic device 400 itself and/or the second reception strength to satisfy the required requirements of the 3GPP standard. In an embodiment of the disclosure, the electronic device 400 may determine to reduce at least one of the number of channel measurement operations and the number of system information check operations when the wake up signal 610 is detected, the second reception strength exceeds a first threshold value, a reception strength of the wake up signal 610 exceeds a second threshold value, and the first bit is the first value. For example, the electronic device 400 may transmit the channel measurement report to the base station 310 by performing the channel measurement ten times in the first reporting period and may check whether the system information is changed every first check period when the second reception strength is less than the first threshold value. The electronic device 400 may determine to perform the channel measurement by the number of times (e.g., five times) that is less than ten times described above in the first reporting period and may determine to check the system information at a period that is longer than the first check period when the second reception strength exceeds the first threshold value, the reception strength of the wake up signal 610 exceeds the second threshold value, and the first bit is the first value.

According to various embodiments of the disclosure, the electronic device 400 may determine to perform the channel measurement operation and the system information check operation at the same time when the wake up signal 610 is detected, the second reception strength exceeds the first threshold value, the reception strength of the wake up signal 610 exceeds the second threshold value, and the first bit is the first value. For example, the channel measurement period may be 1 second, and the first check period may be 10 seconds. The electronic device 400 may increase the channel measurement period to 10 seconds and may perform the channel measurement operation and the system information check operation at the same time when the wake up signal 610 is detected, the second reception strength exceeds the first threshold value, the reception strength of the wake up signal 610 exceeds the second threshold value, and the first bit is the first value.

Referring to FIG. 7, the electronic device 400 may perform a power-saving operation when the first bit is a second value (e.g., 0). For example, the electronic device 400 may reduce power consumption by deactivating the first communication module 420 and/or the processor 430 when the first bit is the second value.

Figure 8:
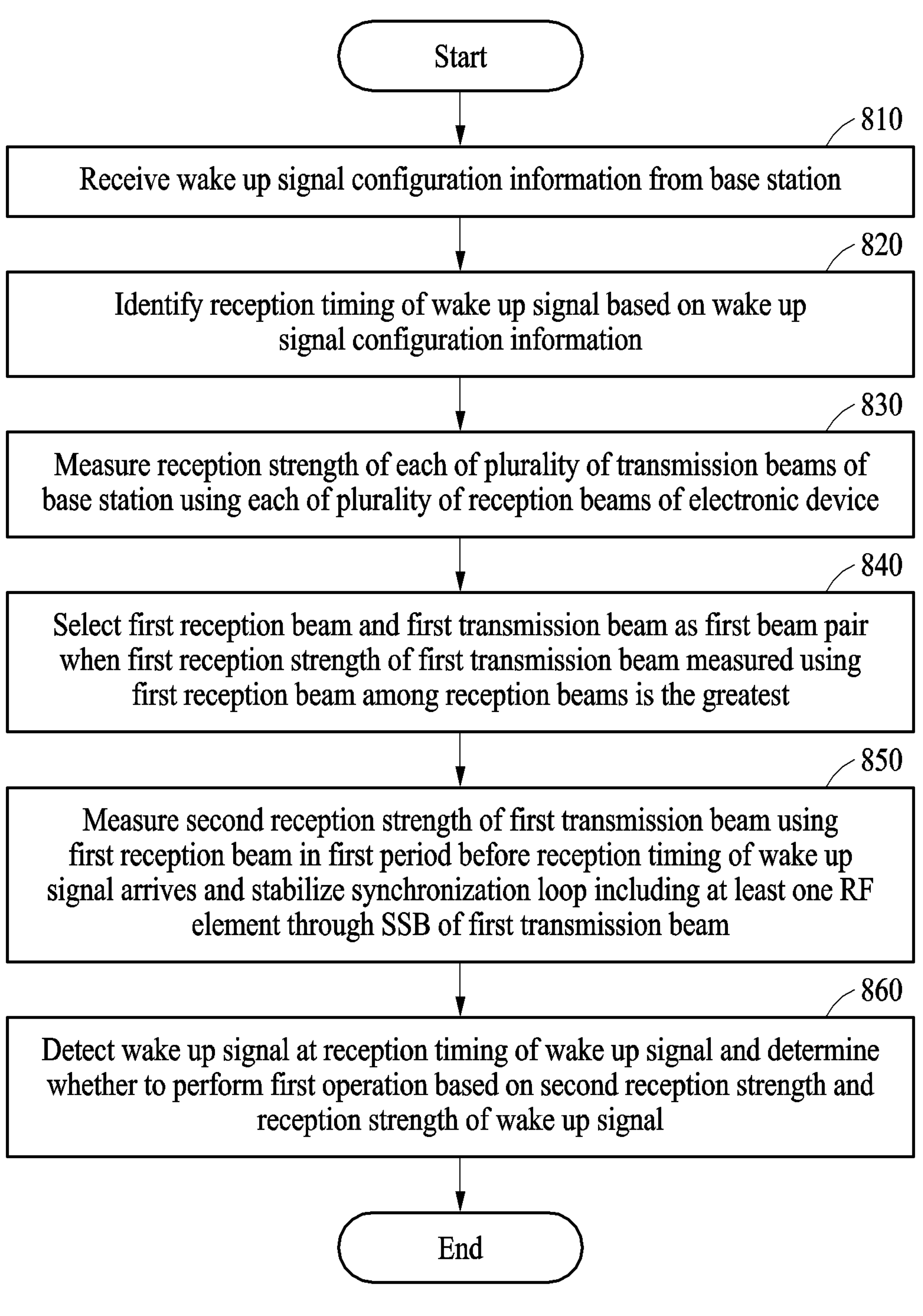
FIG. 8 is a flowchart illustrating a method of operating an electronic device according to an embodiment of the disclosure.

FIG. 8 is a flowchart illustrating a method of operating an electronic device according to an embodiment of the disclosure.

Referring to FIG. 8, in operation 810, the electronic device 400 may receive wake up signal configuration information from the base station 310. In an embodiment of the disclosure, the wake up signal configuration information may be included in an radio resource control (RRC) message.

In operation 820, the electronic device 400 may identify the $t_{WUS}$ based on the wake up signal configuration information.

In operation 830, the electronic device 400 may measure a reception strength of each of a plurality of transmission beams of the base station 310 using each of a plurality of reception beams.

In operation 840, the electronic device 400 may select a first reception beam and a first transmission beam as a first beam pair when a first reception strength of the first transmission beam measured using the first reception beam among the reception beams is the greatest.

In operation 850, the electronic device 400 may measure a second reception strength of the first transmission beam using the first reception beam in a first period before the $t_{WUS}$ arrives and may stabilize a synchronization loop including at least one RF element through an SSB of the first transmission beam.

In operation 860, the electronic device 400 may detect a wake up signal at the $t_{WUS}$ and may determine whether to perform a first operation based on the second reception strength and a reception strength of the wake up signal.

The embodiments provided with reference to FIGS. 1 to 7 may also apply to the embodiments of FIG. 8, and thus, a detailed description thereof is omitted.

According to various embodiments of the disclosure, the electronic device 400 may include the antenna module 410, the first communication module 420 that transmits and receives a signal to and from the base station 310 through the antenna module 410, and the processor 430 electrically connected to the first communication module 420. The processor 430 may identify a reception timing of a wake up signal based on wake up signal configuration information received from the base station 310, select one of transmission beams of the base station 310 and one of reception beams of the electronic device 400 as a beam pair, measure a reception strength (e.g., the second reception strength described above with reference to FIGS. 5 and 8) of the selected transmission beam of the beam pair using the selected reception beam of the beam pair (e.g., the first beam pair described above with reference to FIG. 4) in an SSB burst period before the reception timing arrives, stabilize a synchronization loop including at least one RF element through an SSB of the selected transmission beam of the beam pair, detect the wake up signal transmitted from the base station 310 at the reception timing, and determine whether to perform a beam searching operation based on the measured reception strength and a reception strength of the wake up signal.

The synchronization loop may include at least one of an AGC element and an AFC element, and the processor 430 may stabilize the synchronization loop by adjusting a set value of at least one of the AFC element and the AFC element.

The processor 430 may determine not to perform the beam searching operation when the measured reception strength exceeds a first threshold value, and the reception strength of the wake up signal exceeds a second threshold value.

The processor 430 may perform, in a state in which the measured reception strength exceeds the first threshold value, and the reception strength of the wake up signal exceeds the second threshold value, a data reception operation on duration of a DRX operation when a first bit in the wake up signal represents a first value and may perform a power-saving operation when the first bit represents a second value.

The processor 430 may determine to reduce at least one of the number of channel measurement operations and the number of system information check operations when the measured reception strength exceeds the first threshold value, the reception strength of the wake up signal exceeds the second threshold value, and the first bit in the wake up signal represents the first value.

The processor 430 may perform the beam searching operation when the wake up signal fails to be detected, and the measured reception strength is less than the first threshold value and may perform the beam searching operation when the measured reception strength is less than the first threshold value, the wake up signal is detected, and the reception strength of the wake up signal is less than the second threshold value.

The processor 430 may perform the beam searching operation when a first case in which the measured reception strength is less than the first threshold value, and the reception strength of the wake up signal exceeds the second threshold value occurs, and the first case is repeated more than the first number of times.

The processor 430 may transmit an SR to the base station 310 when a second case in which the wake up signal fails to be detected, and the measured reception strength exceeds the first threshold value occurs, and the second case is repeated more than the second number of times.

The processor 430 may identify whether PDCCH information is received from the base station 310 according to an SR and may perform an RACH operation when the PDCCH information is not received.

The processor 430 may determine that the wake up signal is detected when the reception strength of the wake up signal is greater than or equal to a first strength value and may determine that the wake up signal fails to be detected when the reception strength of the wake up signal is less than the first strength value.

According to various embodiments of the disclosure, the electronic device 400 may include the antenna module 410, the first communication module 420 that transmits and receives a signal to and from the base station 310 through the antenna module 410, and the processor 430 electrically connected to the first communication module 420. The processor 430 may identify a reception timing of a wake up signal based on wake up signal configuration information received from the base station 310, select one of transmission beams of the base station 310 and one of reception beams of the electronic device 400 as a beam pair, measure the selected transmission beam of the beam pair using the selected reception beam of the beam pair in an SSB burst period before the reception timing arrives, stabilize a synchronization loop including at least one RF element by adjusting a set value of at least one RF element through an SSB of the selected transmission beam of the beam pair, and determine not to perform a beam searching operation when the wake up signal is detected at the reception timing, the measured reception strength exceeds a first threshold value, and a reception strength of the wake up signal exceeds a second threshold value.

The set value may include at least one of the gain of an AGC element and the frequency offset of an AFC element.

The first operation may include the beam searching operation.

The processor 430 may perform the data reception operation on duration of the DRX operation when the first bit in the wake up signal represents a first value and may perform the power-saving operation when the first bit represents a second value.

The processor 430 may determine to reduce at least one of the number of channel measurement operations and the number of system information check operations when the wake up signal is detected, the measured reception strength exceeds the first threshold value, the reception strength of the wake up signal exceeds the second threshold value, and the first bit in the wake up signal represents the first value.

The processor 430 may perform the beam searching operation when the wake up signal fails to be detected, and the measured reception strength is less than the first threshold value.

The processor 430 may perform the beam searching operation when the wake up signal is detected, the measured reception strength is less than the first threshold value, and the reception strength of the wake up signal is less than the second threshold value.

The processor 430 may perform the beam searching operation when a first case in which the measured reception strength is less than the first threshold value, and the reception strength of the wake up signal exceeds the second threshold value occurs and the first case is repeated more than the first number of times.

The processor 430 may transmit an SR to the base station 310 when a second case in which the wake up signal fails to be detected, and the measured reception strength exceeds the first threshold value occurs and the second case is repeated more than the second number of times.

The processor 430 may identify whether PDCCH information is received from the base station 310 according to the SR and may perform an RACH operation when the PDCCH information is not received.

According to various embodiments of the disclosure, a method of operating the electronic device 400 may include receiving wake up signal configuration information from the base station 310, identifying a reception timing of a wake up signal based on the wake up signal configuration information, measuring a reception strength of each of a plurality of transmission beams of the base station 310 using each of a plurality of reception beams of the electronic device 400, selecting a first reception beam and a first transmission beam as a first beam pair when a first reception strength of the first transmission beam measured using the first reception beam among the plurality of reception beams is the greatest, measuring a second reception strength of the first transmission beam using the first reception beam in an SSB burst period before the reception timing arrives, stabilizing a synchronization loop including at least one RF element through an SSB of the first transmission beam, and detecting the wake up signal at the reception timing and determining whether to perform a beam searching operation based on the second reception strength and a reception strength of the wake up signal.

The synchronization loop may include at least one of an AGC element and an AFC element. The stabilizing may include stabilizing the synchronization loop by adjusting a set value of at least one of the AFC element and the AFC element.

The determining of whether to perform the beam searching operation may include determining not to perform the beam searching operation when the second reception strength exceeds a first threshold value, and the reception strength of the wake up signal exceeds a second threshold value or determining to perform the beam searching operation when the second reception strength is less than the first threshold value, and the reception strength of the wake up signal is less than the second threshold value or determining to perform the beam searching operation when a first case in which the second reception strength is less than the first threshold value, and the reception strength of the wake up signal exceeds the second threshold value occurs, and the first case is repeated more than the first number of times.

The method may further include, in a state in which the second reception strength exceeds the first threshold value, and the reception strength of the wake up signal exceeds the second threshold value, performing a data reception operation on duration of a DRX operation when a first bit in the wake up signal represents a first value and performing a power-saving operation when the first bit represents a second value or determining to reduce at least one of the number channel measurement operations and the number of system information check operations when the second reception strength exceeds the first threshold value, the reception strength of the wake up signal exceeds the second threshold value, and the first bit in the wake up signal represents the first value.

The method may further include transmitting an SR to the base station when a second case in which the wake up signal fails to be detected, and the measured reception strength exceeds the first threshold value occurs, and the second case is repeated more than the second number of times.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

an antenna module;

a first communication module configured to transmit and receive a signal to and from a base station through the antenna module;

memory storing one or more computer programs; and one or more processors communicatively coupled to the first communication module, the antenna module, and the memory, wherein the one or more computer programs include computer-executable instructions that, when executed by the one or more processors, cause the electronic device to:

identify a reception timing of a wake up signal based on wake up signal configuration information received from the base station, select one of transmission beams of the base station and one of reception beams of the electronic device as a beam pair, measure a reception strength of the selected transmission beam of the beam pair using the selected reception beam of the beam pair in a synchronization signal block (SSB) burst period before the reception timing arrives, adjusting a set value of at least one of an automatic gain control (AGC) element or an automatic frequency control (AFC) element through an SSB of the selected transmission beam of the beam pair, detect the wake up signal transmitted from the base station at the reception timing after adjusting the set value, and determine whether to perform a beam searching operation based on the measured reception strength and a reception strength of the wake up signal.

2. The electronic device of claim 1, wherein the one or more computer programs further include computer-executable instructions that, when executed by the one or more processors, cause the electronic device to determine not to perform the beam searching operation when the measured reception strength exceeds a first threshold value, and the reception strength of the wake up signal exceeds a second threshold value.

3. The electronic device of claim 1, wherein the one or more computer programs further include computer-executable instructions that, when executed by the one or more processors, cause the electronic device to, in a state in which the measured reception strength exceeds a first threshold value, and the reception strength of the wake up signal exceeds a second threshold value, perform a data reception operation on duration of a discontinuous reception (DRX) operation when a first bit in the wake up signal represents a first value and perform a power-saving operation when the first bit represents a second value.

4. The electronic device of claim 1, wherein the one or more computer programs further include computer-executable instructions that, when executed by the one or more processors, cause the electronic device to determine to reduce at least one of a number of channel measurement operations and a number of system information check operations when the measured reception strength exceeds a first threshold value, the reception strength of the wake up signal exceeds a second threshold value, and a first bit in the wake up signal represents a first value.

5. The electronic device of claim 1, wherein the one or more computer programs further include computer-executable instructions that, when executed by the one or more processors, cause the electronic device to:

perform the beam searching operation when the wake up signal fails to be detected, and the measured reception strength is less than a first threshold value, and perform the beam searching operation when the measured reception strength is less than the first threshold value, the wake up signal is detected, and the reception strength of the wake up signal is less than a second threshold value.

6. The electronic device of claim 1, wherein the one or more computer programs further include computer-executable instructions that, when executed by the one or more processors, cause the electronic device to perform the beam searching operation when a first case in which the measured reception strength is less than a first threshold value, and the reception strength of the wake up signal exceeds a second threshold value occurs, and the first case is repeated more than a first number of times.

7. The electronic device of claim 1, wherein the one or more computer programs further include computer-executable instructions that, when executed by the one or more processors, cause the electronic device to transmit a scheduling request to the base station when a second case in which the wake up signal fails to be detected, and the measured reception strength exceeds a first threshold value occurs, and the second case is repeated more than a second number of times.

8. The electronic device of claim 7, wherein the one or more computer programs further include computer-executable instructions that, when executed by the one or more processors, cause the electronic device to:

identify whether physical downlink control channel (PDCCH) information is received from the base station according to the scheduling request, and perform a random-access channel (RACH) operation when the PDCCH information is not received.

9. The electronic device of claim 1, wherein the one or more computer programs further include computer-executable instructions that, when executed by the one or more processors, cause the electronic device to:

determine that the wake up signal is detected when the reception strength of the wake up signal is greater than or equal to a first strength value, and determine that the wake up signal fails to be detected when the reception strength of the wake up signal is less than the first strength value.

10. A method of operating an electronic device, the method comprising:

receiving wake up signal configuration information from a base station;

identifying a reception timing of a wake up signal based on the wake up signal configuration information;

measuring a reception strength of each of a plurality of transmission beams of the base station using each of a plurality of reception beams of the electronic device;

when a first reception strength of a first transmission beam measured using a first reception beam among the plurality of reception beams is the greatest, selecting the first reception beam and the first transmission beam as a first beam pair;

measuring a second reception strength of the first transmission beam using the first reception beam in a synchronization signal block (SSB) burst period before the reception timing arrives and adjusting a set value of at least one of an automatic gain control (AGC) element or an automatic frequency control (AFC) element through an SSB of the first transmission beam; and detecting the wake up signal at the reception timing after adjusting the set value and determining whether to perform a beam searching operation based on the second reception strength and a reception strength of the wake up signal.

11. The method of claim 10, wherein the determining of whether to perform the beam searching operation comprises:

determining not to perform the beam searching operation when the second reception strength exceeds a first threshold value, and the reception strength of the wake up signal exceeds a second threshold value; or determining to perform the beam searching operation when the second reception strength is less than the first threshold value, and the reception strength of the wake up signal is less than the second threshold value or determining to perform the beam searching operation when a first case in which the second reception strength is less than the first threshold value, and the reception strength of the wake up signal exceeds the second threshold value occurs, and the first case is repeated more than a first number of times.

12. The method of claim 10, further comprising:

in a state in which the second reception strength exceeds a first threshold value, and the reception strength of the wake up signal exceeds a second threshold value, performing a data reception operation on duration of a discontinuous reception (DRX) operation when a first bit in the wake up signal represents a first value and performing a power-saving operation when the first bit represents a second value.

13. The method of claim 12, further comprising:

determining to reduce at least of a number of channel measurement operations and a number of system information check operations when the second reception strength exceeds the first threshold value, the reception strength of the wake up signal exceeds the second threshold value, and the first bit in the wake up signal represents the first value.

14. The method of claim 10, further comprising:

transmitting a scheduling request to the base station when a second case in which the wake up signal fails to be detected, and the measured reception strength exceeds a first threshold value occurs, and the second case is repeated more than a second number of times.

15. The method of claim 10, further comprising:

performing the beam searching operation when the wake up signal fails to be detected, and the measured reception strength is less than a first threshold value; and performing the beam searching operation when the measured reception strength is less than the first threshold value, the wake up signal is detected, and the reception strength of the wake up signal is less than a second threshold value.

16. The method of claim 10, further comprising:

performing the beam searching operation when a first case in which the measured reception strength is less than a first threshold value, and the reception strength of the wake up signal exceeds a second threshold value occurs, and the first case is repeated more than a first number of times.

17. One or more non-transitory computer-readable storage media storing computer-executable instructions that, when executed by one or more processors of an electronic device, cause the electronic device to perform operations, the operations comprising:

receiving wake up signal configuration information from a base station;

identifying a reception timing of a wake up signal based on the wake up signal configuration information;

measuring a reception strength of each of a plurality of transmission beams of the base station using each of a plurality of reception beams of the electronic device;

when a first reception strength of a first transmission beam measured using a first reception beam among the plurality of reception beams is the greatest, selecting the first reception beam and the first transmission beam as a first beam pair;

measuring a second reception strength of the first transmission beam using the first reception beam in a synchronization signal block (SSB) burst period before the reception timing arrives and adjusting a set value of at least one of an automatic gain control (AGC) element or an automatic frequency control (AFC) element through an SSB of the first transmission beam; and detecting the wake up signal at the reception timing after adjusting the set value and determining whether to perform a beam searching operation based on the second reception strength and a reception strength of the wake up signal.

* * * * *